United States Patent [19]
Dunne et al.

[11] Patent Number: 5,926,260
[45] Date of Patent: Jul. 20, 1999

[54] COMPACT LASER-BASED DISTANCE MEASURING APPARATUS

[75] Inventors: Jeremy G. Dunne, Littleton; Blair J. Zykan; Eric A. Miller, both of Englewood, all of Colo.

[73] Assignee: Laser Technology, Inc., Englewood, Colo.

[21] Appl. No.: 08/926,598

[22] Filed: Aug. 21, 1997

Related U.S. Application Data

[63] Continuation-in-part of application No. 08/717,635, Sep. 23, 1996, Pat. No. 5,703,678, which is a continuation of application No. 08/375,941, Jan. 19, 1995, Pat. No. 5,574,552
[60] Provisional application No. 60/024,539, Aug. 22, 1996.
[51] Int. Cl.$^6$ ........................................................ G01C 3/08
[52] U.S. Cl. ........................ 356/5.05; 356/4.01; 356/5.01; 356/5.1
[58] Field of Search .................................. 356/4.01, 5.15

[56] References Cited

U.S. PATENT DOCUMENTS

| | | |
|---|---|---|
| 3,464,770 | 9/1969 | Schmidt . |
| 3,654,477 | 4/1972 | Benjamin, Jr. . |
| 3,832,056 | 8/1974 | Shipp et al. . |
| 4,214,242 | 7/1980 | Colin . |
| 4,346,989 | 8/1982 | Gort et al. . |
| 4,453,825 | 6/1984 | Buck et al. . |
| 5,046,839 | 9/1991 | Krangle . |
| 5,221,956 | 6/1993 | Patterson et al. . |
| 5,311,271 | 5/1994 | Hurt et al. . |
| 5,359,404 | 10/1994 | Dunne . |
| 5,418,609 | 5/1995 | Dunne . |
| 5,574,552 | 11/1996 | Dunne . |
| 5,612,779 | 3/1997 | Dunne . |
| 5,623,335 | 4/1997 | Bamberger ............................ 356/5.01 |
| 5,652,651 | 7/1997 | Dunne . |
| 5,669,174 | 9/1997 | Teetzel ................................... 356/5.01 |
| 5,760,887 | 6/1998 | Fink et al. ............................. 356/5.03 |

OTHER PUBLICATIONS

RCA AN/GUS–5; Burlington, MA 01803; Aug. 30, 1976.

*Primary Examiner*—Stephen C. Buczinski
*Attorney, Agent, or Firm*—William J. Kubida; John R. Wahl; Holland & Hart LLP

[57] ABSTRACT

A light-weight, hand-held range finding apparatus of the present invention includes signal emitting circuitry and lens for emitting signals, and signal receiving circuitry and lens for receiving reflected signals, which are positioned within a chamber of a housing. The housing includes an upper section to which a sighting device is attached, a front end through which the emitted signals are emitted and the reflected signals are received, a back panel having a display device attached to said housing for displaying operational selections and range findings. An actuator is mounted adjacent the upper section and is operably connected to the signal emitting circuitry. The actuator is used to select desired operational selections displayed on the display device and actuating the signal emitting circuitry.

12 Claims, 6 Drawing Sheets

Fig. 13  Fig. 14

COMPACT LASER-BASED DISTANCE MEASURING APPARATUS

CROSS REFERENCE TO RELATED APPLICATIONS

The present application claims the benefit of U.S. Provisional patent application Ser. No. 60/024,539, filed Aug. 22, 1996. The present application is also a continuation in part of U.S. patent application Ser. No. 08/717,635, filed Sep. 23, 1996, now U.S. Pat. No. 5,703,678 which is a continuation of U.S. patent application Ser. No. 08/375,941, filed Jan. 19, 1995, now U.S. Pat. No. 5,574,552.

BACKGROUND OF THE INVENTION

1. Field of the Invention

This invention relates to range finding equipment, especially to laser-based range finding and distance measuring apparatus. More particularly, this invention relates to a measuring apparatus which may be held, aimed, and operated with one hand by a user to determine measurable parameters such as distance, elevation, inclination and range. This invention also relates to an electronic filtering feature in a laser-based range finding apparatus, wherein the electronic filter, when enabled by the user, rejects spurious reflected signals from the ranging calculation.

2. Description of the Related Art

A laser-based distance and ranging measuring device is described in U.S. Pat. No. 5,359,404 entitled "Laser-based Speed Measuring Device," the disclosure of which applicants expressly incorporate by reference herein. Other recently issued U.S. Patents relating to laser based measuring devices, assigned to the assignee of the present invention, include U.S. Pat. Nos. 5,612,779 and 5,652,651, the disclosures of which applicants also expressly incorporate by reference herein.

Distances, as measured in a laser-based ranging device, are generally determined by calculating the time of flight of a laser pulse to and from a desired target. An elapsed time measurement is calculated based on, among other things, a clock signal, a counter triggered on by transmission of a laser pulse and triggered off by the receipt of a reflected pulse signal from the target. The reflected pulse signal is detected by the ranging device using a light sensing receiver. The distance may then be determined based on the clock pulse width using the number of pulses counted between transmission and reception or by using methods such as the precision timing technique described in the above identified patents.

The accuracy of the desired ranging measurement in a laser range finding device can be compromised if reflective obstacles exist between the ranging device and the desired target. For instance, if the ranging device is being used to measure an outdoor distance between the ranging device and a wall, it is possible that the ranging device may detect reflected pulses from objects in the line of sight, such as reflections off of shrubbery and trees, etc. In prior ranging devices, it is understood that optical filters have been used to distinguish between noise signals and the desired signal reflected from the target. However, these filters are somewhat cumbersome to carry, install and remove. What is needed is a laser range finding device having a built in feature whereby the user of the device in the field can simply exclude such unwanted reflections. For example, what is needed is a means to selectively adjust the sensitivity of the receiver of the device, so that when the user attempts to measure a distance or range to an object where other reflective objects exist between and in the line of sight of the object and the ranging device, the ranging device will ignore the spurious reflections from the non-target objects.

In addition, because prior art devices can weight six pounds or more, such devices are preferably tripod mounted. An operator typically needs both hands to both hold and operate a conventional range finding device. When the device is operated while hand held, the operator soon fatigues, especially when the unit is operated at arms length. Thus, there is a continuing need for range finding and distance determining equipment which can be used without causing fatigue to the operator and which can be operated by a user in the field having only one free hand to hold, aim and operate the apparatus.

Thus there remains a need for a distance measuring apparatus which includes a simply selectable user actuated capability to discriminate between true target reflections and spurious reflected signals, and such equipment which may be used with one hand and without the necessity for the operator to continually need to obtain operational instructions from a manual or instruction book. It is against this background that the significant improvements and advancement of the present invention have taken place in the field of laser based distance measuring apparatuses.

SUMMARY OF THE INVENTION

A primary object of the invention is to provide a distance measuring apparatus which is light weight and designed to be held, aimed, and operated by an individual using only one hand.

It is another object of the invention to provide a hand held distance measuring apparatus which my be equally operated with either a user's right or left hand.

It is a still further object of the invention to provide a hand held distance measuring apparatus which includes a user selectable filtering mode which alters the receive circuitry sensitivity for positively discriminating between spurious reflections and target reflections.

A light-weight, hand-held range finding apparatus in accordance with the present invention includes signal emitting circuitry and lens for emitting and transmitting laser pulse signals, and signal receiving circuitry and lens for receiving reflected signals, and a signal processor, all of which are positioned within a chamber of a compact housing. The housing includes an upper section to which a sighting device is attached, a front panel through which the laser pulses are transmitted and the reflected signals are received, a back panel having a display device attached thereto for displaying operational mode selections and measured range values. An actuator comprising a pair of preferably identical control panels or keypads is incorporated into or mounted on the upper section of the housing such that one keypad, the primary keypad, is actuatable by the fingers of a user's hand while that hand is holding and aiming the apparatus. The other keypad may be configured to be the primary keypad when the user's other hand is used to hold and aim the apparatus. This actuator is operably connected to the signal emitting circuitry and processor control. The actuator is used to select desired operational modes and data selections displayed on the display device and to trigger the signal emitting circuitry to transmit laser pulse signals. Either keypad may be configured by the user as the primary keypad, depending on whether the user is right or left handed. The primary keypad is the only keypad necessary to be operated when taking any of the possible measurements with the apparatus. The secondary keypad provides support and calibration command functions that are not utilized while taking measurements.

The apparatus in accordance with the present invention also includes an electronic filter mode, engagable via command from the keypads, which can reject spurious reflected signals from non-target objects, when engaged. The electronic filter mode of the present invention is designed for use with high reflectivity objects such as a mirror, and is ideally suited for use where the user mounts a reflector on the target so that the desired reflected signal from the target is known to have a substantially higher amplitude than the spurious reflections from non-target objects.

The method of the present invention includes the steps of providing a range finding apparatus having a housing defining an internal chamber containing signal emitting circuitry for emitting signals and signal receiving circuitry for receiving reflected signals, and a sighting device mounted to the housing, holding the housing in one hand, making operational selections of one of a plurality of determinations to be made by the apparatus with the same hand, and actuating the signal emitting circuitry with the same hand while continuing to hold the apparatus.

In the preferred embodiment, the operational selections made by the operator, i.e., the user, are displayed on a display screen mounted on the back panel of the apparatus, and the method further includes the steps of scrolling through a plurality of the display screens by actuating a screen display controller of the apparatus via the keypad with a finger of the same hand, while continuing to hold and aim the apparatus with that hand.

The present invention is light weight, on the order of a couple of pounds, and is designed to be held and operated with one hand. Because of its light weight, and because the apparatus does not need to be held at arm's length, but rather is held close to the user's face, it can be operated for an extended time without causing undue operator fatigue. In addition, the apparatus of the present invention can be operated by a single user having only one hand free, either the right or the left, to operate the apparatus. The inclusion of the display with a plurality of selectable operational mode and option indicators in the preferred embodiment of the present invention obviates the need for keeping a manual or instruction book on hand when using the apparatus. Finally, the range finding apparatus of the present invention can selectably filter out spurious signals which otherwise might lead to inaccurate distance determinations.

Other objects, features and advantages of the present invention will become apparent from a reading of the following detailed description when taken in conjunction with the accompanying drawing wherein a particular embodiment of the invention is disclosed as an illustrative example.

DETAILED DESCRIPTION OF THE INVENTION

A preferred embodiment of a compact laser-based distance-based measuring apparatus 10 of the present invention is shown in FIGS. 1–9. Although the apparatus 10 is referred to herein as a range finding apparatus, it should be understood that the term range finding apparatus is intended to include any device incorporating any combination of conventional surveying/measuring functions including, for example, range, azimuth, inclination, coordinate, height, and remote diameter or width determinations.

Figure 1:
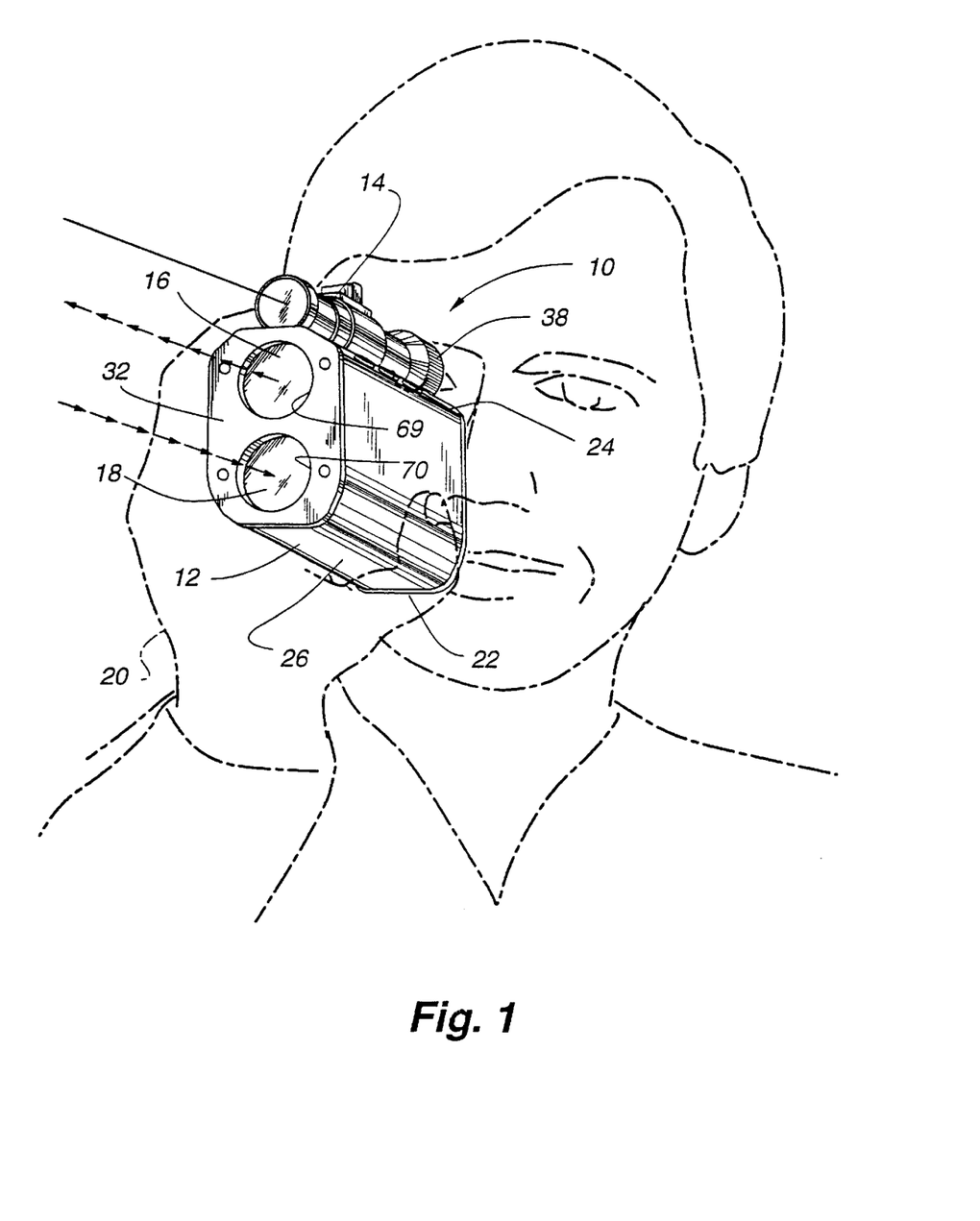
FIG. 1 is a perspective view of an operator using a range finding apparatus of the present invention.
Figure 2:
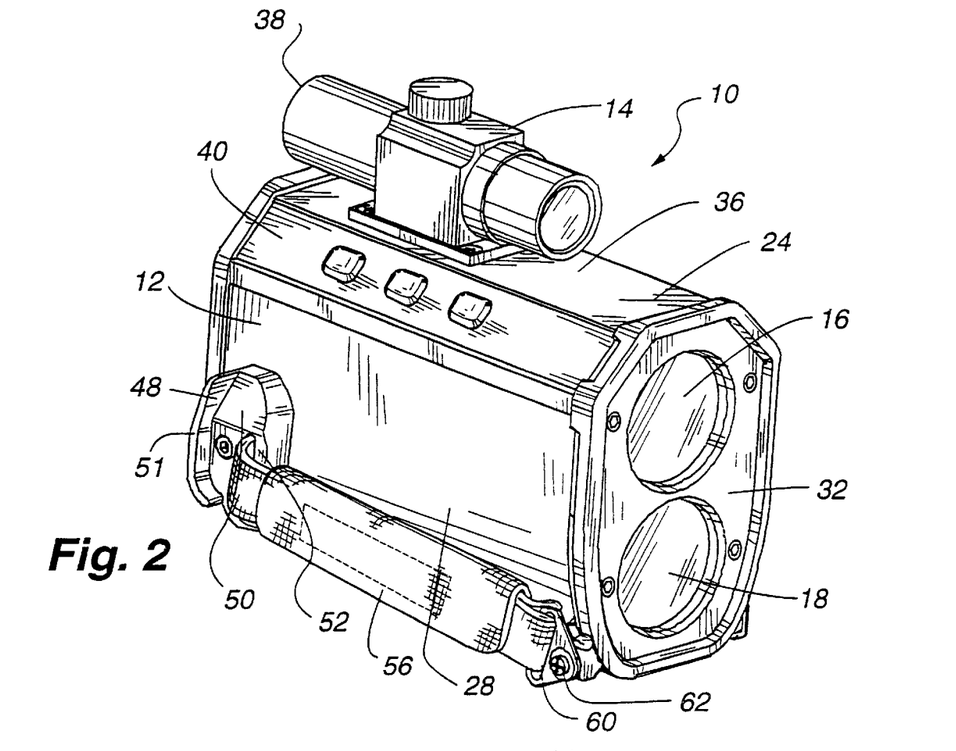
FIG. 2 is a front perspective view of the range finding apparatus shown in FIG. 1.
Figure 3:
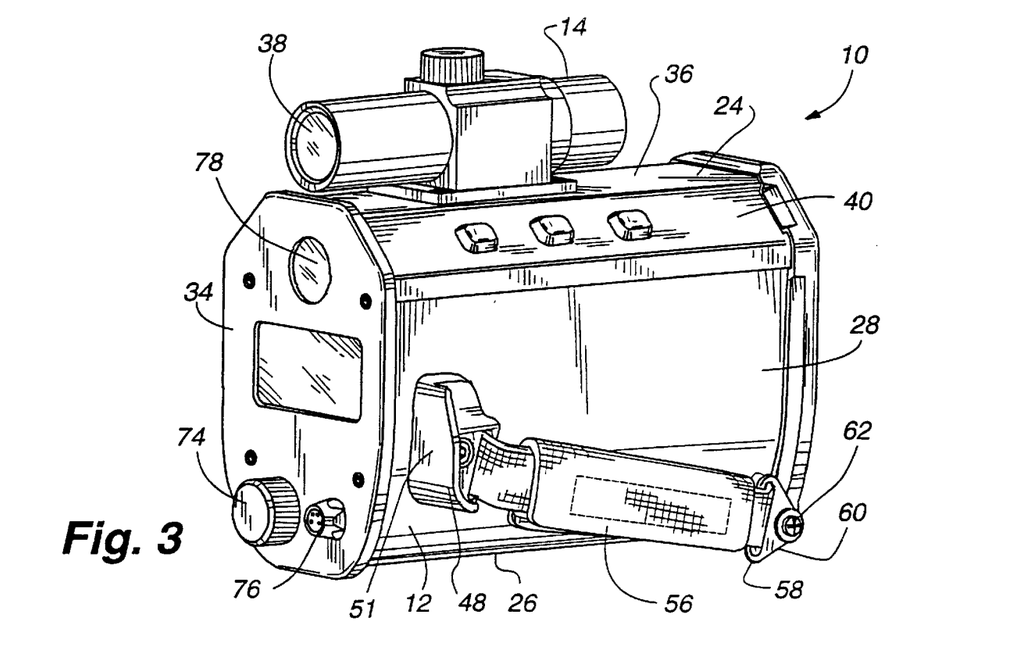
FIG. 3 is a back perspective view of the range finding apparatus shown in FIGS. 1 and 2.
Figure 4:
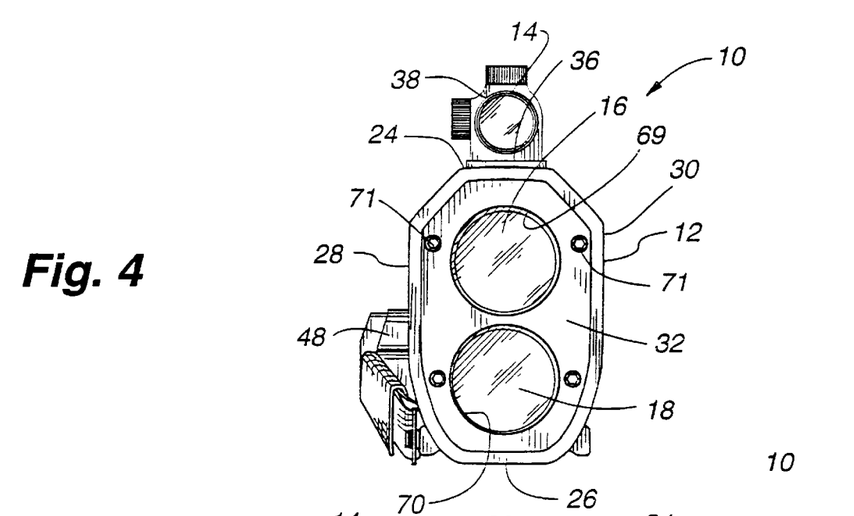
FIG. 4 is a front elevational view of the range finding apparatus shown in FIGS. 2 and 3

The range finding apparatus 10 includes a compact housing 12 to which is mounted a sighting device 14. The housing 12 defines an internal chamber (not shown) in which signal emitting circuitry (not shown), a signal emitting lens 16, signal receiving circuitry (not shown) and a receiving lens 18 for receiving reflected signals, are positioned. As is shown in FIG. 1, the range finding apparatus 10 of the preferred embodiment is specially adapted to be held by a single hand 20 of an operator secured and steadied by the thumb 22 of the hand 20, and operatively controlled by movements of the fingers of the same hand 20.

More particularly, the housing 12 of the preferred embodiment includes upper and lower sections 24 and 26, right and left side sections 28 and 30, and front and back panels 32 and 34. The upper, lower, left and right side sections 24, 26, 28, and 30 are preferably portions of a one piece extruded aluminum tubular housing body. The front and back panels 32 and 34 are conventionally fastened to the housing body to close and provide a moisture barrier for the housing 10. The upper section 24 includes an apex portion 36 to which is mounted the sighting device 14, preferably a red dot sighting scope. The sighting device 14 includes a viewing end 38 adjacent the back panel 34. Positioned on the upper section 24 adjacent the right side section 28 is a right control panel 40 containing first set of control buttons 42a, 42b and 42c. Positioned on the upper section 24 adjacent the left side section 30 is a left control panel 44 containing a second set of control buttons 46a, 46b and 46c. The control panels 40 and 44 and the associated control buttons are preferably identical to each other.

Mounted on the right side section 28 is a thumb rest 48 having a base portion 50, an outwardly projecting flange 51 extending from the base portion 50 and a strap retaining plate 53 fastened to the base portion 50 via fastener 54. The retaining plate 53 has a slot 52 therethrough. The fastener screw 54 mounted through the retaining plate 53 and the base portion 50 attaches the thumb rest 48 to the right side section 28 of the housing 12 via a threaded bore 64 (not visible in the right side section 28 as illustrated).

The slot 52 is adapted to receive one end of an elongated strap 56. The opposing end of the strap 56 is received in a slot 58 formed in an anchor plate 60, which is mounted to the housing 12 by a fastener screw 62 in another threaded bore 64 in the right side section 28 adjacent the lower section 26, at a height which is lower than the attachment position of the thumb rest 48.

Formed in the left side section 30 is a pair of threaded apertures 64 which are spaced directly opposite to the threaded bores or apertures 64 in the right side section 28. These apertures 64 are adapted to receive a left-handed thumb rest, (a mirror image of the thumb rest 48 shown in the Figures), the strap 56 and the anchor plate 60 so that a left handed user may operate the apparatus with only one hand. This left handed configuration is shown in phantom dashed lines in FIG. 7 and may be simply visualized by the reader by reversing the side location of the strap 56, the anchor plate 60, and installing a left thumb rest.

Figure 11:
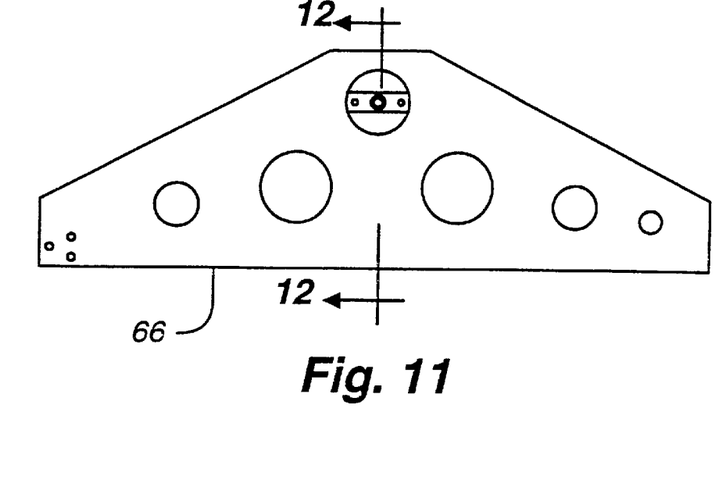
FIG. 11 is a front view of a mounting bracket for mounting the range finding apparatus shown in FIGS. 1–9 to a tripod.
Figure 12:
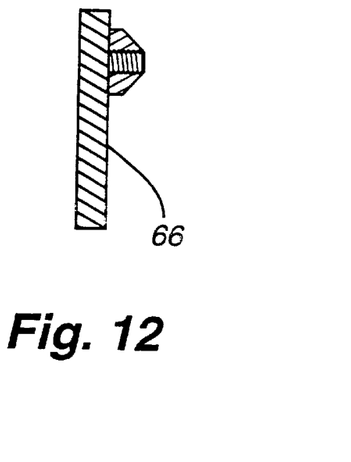
FIG. 12 is a section of the mounting bracket shown in FIG. 11, taken along the line 12—12 of FIG. 11.
Figure 13:
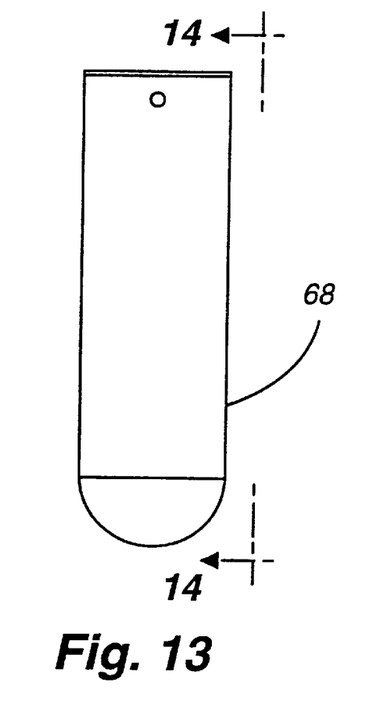
FIG. 13 is a front view of a clip for mounting the range finding apparatus shown in FIGS. 1–9 to an operator's belt.
Figure 14:
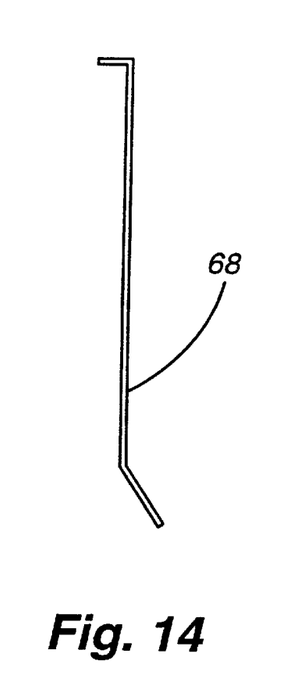
FIG. 14 is a section of the clip shown in FIG. 13, taken along the line 14—14 of FIG. 13.

The apertures 64 on the side section 28 or 30 not used to fasten the strap 56 to the housing 12 may be used to mount a tripod mounting bracket 66 (FIGS. 11 and 12), or attach a belt attachment clip 68 for mounting the range finding apparatus 10 on the belt of the operator when the apparatus is not in use.

The front panel 32 is a generally flat aluminum plate member which supports the transmitting and receiving lenses 16 and 18. The front panel 32 is fastened to the housing 12 with four screws 71. The front panel 32 of the apparatus 10 has a signal emitting aperture 69 which is covered by the lens 16. Also formed in the front panel 32 is a signal receiving aperture 70 which is covered by the receiving lens 18.

An LCD display panel 72 is mounted to the back panel 34. As is described in further detail below, when the apparatus 10 is actuated, the display panel 72 displays a series of menus options containing instructions and selections for the operator, as well as displaying indications of measurements and determinations made by the apparatus 10. Beneath the display panel 72 on the back panel 34 is a battery cap 74 threaded into corresponding threads in a bore (not shown) through the back panel 34 which circumscribes a cylindrical compartment (not shown) extending into the internal chamber (not shown). The cylindrical compartment holds a power supply, such as a pair of AA batteries (not shown) mounted end to end, which provides power to the apparatus 10. Adjacent the battery cap 74 on the back panel 34 is a connector 76, such as preferably an RS232 serial output port, mounted through another bore through the back panel 34 through which data can be downloaded from the apparatus 10 via an appropriate cable, to a remote device such as a computer, a data-logger, or printer.

Also formed in the back panel 34 above the display screen 72 is an aperture 78 which surrounds a stainless steel grill of a diaphragm speaker 80. The speaker 80 is adapted to emit a predetermined tone from a plurality of predetermined tones, each of which corresponds to a predetermined frequency of vibration of the speaker 80. During operation of the apparatus 10, the speaker 80 emits a predetermined audible tone in response to certain events, such as target acquisition by the receiver circuitry. A different audible tone may be provided for different events so that the user can tell, without actually looking at the display panel 72, what mode of operation the apparatus 10 is in or what measuring function is anticipated as being performed, such as direct distance or horizontal distance, or inclination measurement.

In the preferred embodiment of the apparatus 10, the housing 12 is a one-piece aluminum housing. The end panels 32 and 34 are gasketed to the housing 12 to make the structure water proof. The sides 28 and 30 have a non-slip grip surface. The aluminum construction contributes to the light weight of the apparatus 10, which preferably weighs at most approximately 2.2 pounds. The apparatus 10 is compact in size, have preferred dimensions of approximately 6 inches from front panel to back panel 34, approximately 5 inches in height from the lower section to the top of the sighting device, and approximately 2.5 inches in width measured across the front panel 32 from right side section 28 to left side section 30.

The upper section 24 of the housing 12 is divided into three straight, axially extending portions: the apex portion 36, left control panel portion 44 and right control panel portion 40. These portions are joined together to form an overall curved upper section shape which has an overall larger radius of curvature than the lower section. The lower section 26 is rounded, with has a radius of curvature optimized to allow the lower section of the apparatus 10 to comfortably fit in the hand of the typical user. The upper section right and left control panels 44 and 40, the apex portion 36 of the upper section 24, and the right and left side sections 28 and 30 join together forming faceted surfaces between their respective intersecting edges.

Preferably, the apparatus 10 has a maximum range of at least 500 meters, a range resolution of up to 0.01 meters, and an inclination limit of plus or minus 180 degrees with an inclination accuracy of about ±0.1 degrees.

In accordance with its most preferred embodiment, the range finding apparatus 10 of the present invention also includes a user selectable electronic filter which can reject spurious reflected signals from non-target objects. The electronic filter of the present invention is designed for use with high reflectivity objects, and is ideally suited for use where the user mounts a reflector on the target so that the desired reflected signal from the target is known to have a substantially higher amplitude than the spurious reflections from non-target objects.

More particularly, the user of the ranging device 10 of the present invention can be visually prompted using the display 72 as to enable or disable the electronic filter. Based on the user input received through the user control of the ranging device 10, the processor enables or disables the electronic filter in the received section of the ranging device 10.

In accordance with the present invention, two general modes of operation are disclosed herein. In a high-reflectivity or "filter-on" mode, the laser-based ranging device 10 rejects spurious reflections from non-target objects through the use of either an adjustment of sensitivity or gain of the receive section of the ranging device 10, or by raising the signal threshold point to where the processor recognizes a valid reflected signal received. In the high-reflectivity mode, the present invention can utilize any of these filtering methods in any combination which is preferably determined by software. A reflector can be optionally mounted on the desired target to ensure that the reflected signal from the desired target is of sufficient power to be detected and processed by the receive section of the ranging device operating in high-reflectivity mode. In a non-high-reflectivity mode, the laser based ranging device 10 of the present invention disables the electronic filter mode thereby placing the ranging device in a normal mode of operation.

In operation, when the ranging device is placed in high-reflectivity mode by the user, the processor activates one or more control lines from the processor to the circuits in the receive section of the ranging device. Specifically, these control lines initiate a decrease in the receive diode sensitivity by changing the diode bias voltage and/or by a decrease in gain of the receiver amplifier which decreases the sensitivity of the receive section. Additionally, the processor can increase the minimum required signal threshold level for processing any received signal pulse. In this manner, only reflected signals with sufficient magnitude will be processed, thereby increasing the likelihood that the reflected pulse used in the ranging calculation corresponds to the reflected pulse from the desired target. Further, the software can include a pre-set lookup limit to fine tune the level of acceptable reflected pulses.

Figure 10:
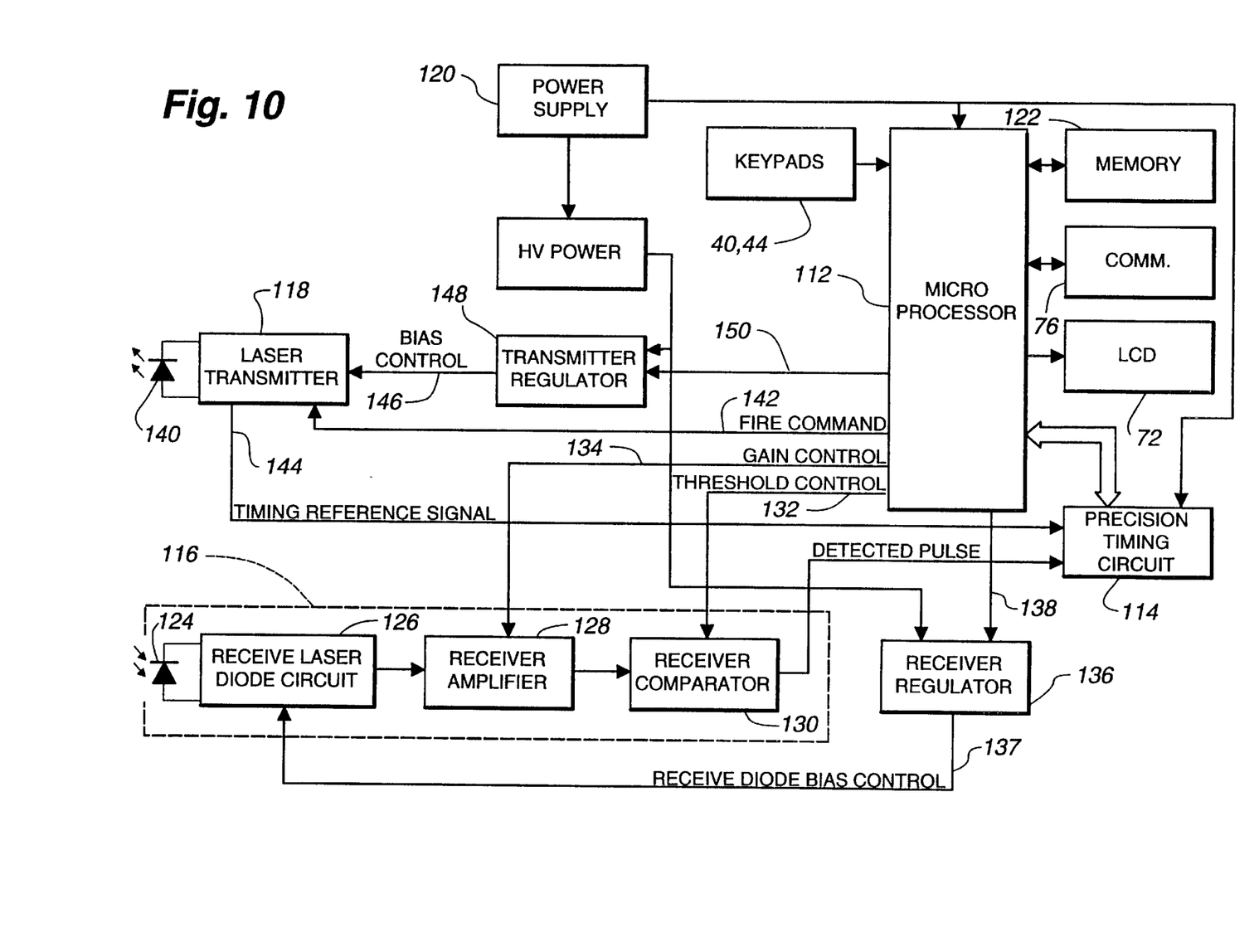
FIG. 10 is a block diagram illustrating the signal filtering technique of the present invention.

FIG. 10 illustrates a block diagram of one embodiment of the apparatus 10 of the present invention. The laser-based range finder 10 has a microprocessor 112 coupled to the display 72, the control keypads 40 and 44 for user input, a precision timing circuit 114, a laser pulse receiver 116 and a laser pulse transmitter 118. The microprocessor 112 is also coupled to a power supply 120, a memory 122 and serial communications port connector 76.

The laser pulse receiver 116 includes a laser diode 124 connected diode operating circuit 126 which is in turn connected to a receiver amplifier 128 and then to a comparator 130. The comparator 130 in turn provides its output to the precision timing circuit 114. The comparator 130 receives a threshold control signal via line 132 from the microprocessor 112. The receiver amplifier 128 receives a gain control signal also from the microprocessor 112 via line 134. The receiver diode operating circuit 126 receives a diode bias control signal via line 137 from a receiver regulator 136 which in turn receives a control signal via line 138 from the microprocessor 112.

The laser pulse transmitter 118 includes a laser transmit diode 140 and receives a fire command via line 142 from the processor 112. The laser pulse transmitter 118 sends a timing reference signal via line 144 to the precision timing circuit 114 and also receives a transmitter bias control signal via line 146 from a transmit regulator 148. The transmit regulator 148 is in turn controlled by the microprocessor 112 via line 150.

The filter function of the present invention is introduced in the high reflectivity mode selected by the user from a visual prompt on display 72. The filter function in accordance with the present invention is implemented via software and involves one or more of four elements. The first element is the receiver bias control provided via line 137 to the receive diode circuit 126. The bias on this line may be increased or decreased by the microprocessor to change the sensitivity of the receiver diode 124 directly. For example, when using an APD detector, its gain can be altered simply by changing the diode operating bias. However, if a pin diode is being used, another method is required as the gain is fixed. The second element is the amplifier gain control signal provided on line 134 to the amplifier 128 from the microprocessor 112. Simply adjusting the amplifier gain for the signals fed into the comparator 130 will change the overall sensitivity of the receiver 116. The third element is provided by the threshold control signal on line 132 from the microprocessor 112. The threshold below which amplified reflection pulse signals will be stopped is changed by the voltage provided on line 132. Changing this threshold voltage on line 132 will change the overall sensitivity of the receiver Finally, the software has the ability of accepting and processing only those received pulses which exceed a pre-determined signal threshold magnitude. The high reflectivity mode of operation may be programmed to utilize any one of these elements either alone or in any combination to provide an overall sensitivity change so as to only be responsive to high reflectivity signals. Conversely, when the user de-selects high-reflectivity mode, processor 112 disables the gain and/or threshold selection elements discussed above so that the settings of receiver 116 gains and thresholds are restored to normal.

Because the operation of the filtering of the present invention is under to control of processor 112, it is understood that each of the four disclosed methods of filtering could be implemented singly or in any combination by a software routine operating within processor 112.

The calibration for the range finding device 10 may be modified between the filtered and unfiltered modes. Calibration is necessary to compensate for the return signal power variations, which affect the determined distance (range) values. The surface of the desired target affects the pulse width of the return signal, which in turn, results in a timing difference at the leading edge of the pulse where the counter is initiated, which further affects the calculated flight time, and thus distance. Since the filter on mode or high reflectivity on mode adjusts some of the circuit characteristics as described above, the calibration values to apply to the filtered return signals may be different than the calibration values to be used for the filter off mode. To generate the calibration table for either mode (filter on or filter off), the device is tested by targeting the signal at a prism at a fixed distance to get a wide range of return signal power variance or, the return signal power variance can be simulated with filters. This testing generates the calibration table values which are then compared to actual distance values inputted by the user.

Referring back now to FIGS. 5 and 7, the keypads 44 and 40 each have three buttons. One panel is designated via software as the primary panel. The other is the secondary panel. The primary panel is the only panel used during measurement operations. The secondary panel is only used for control editing, calibration functions, and power on/off operations of the sighting device and the display.

Figure 5:
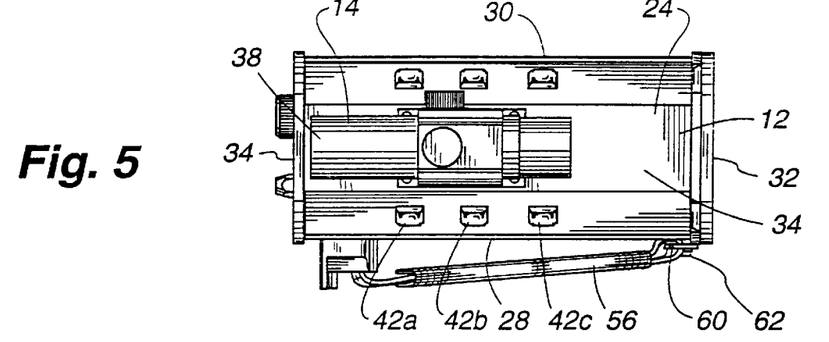
FIG. 5 is a top view of the range finding apparatus shown in FIGS. 2 and 3.
Figure 6:
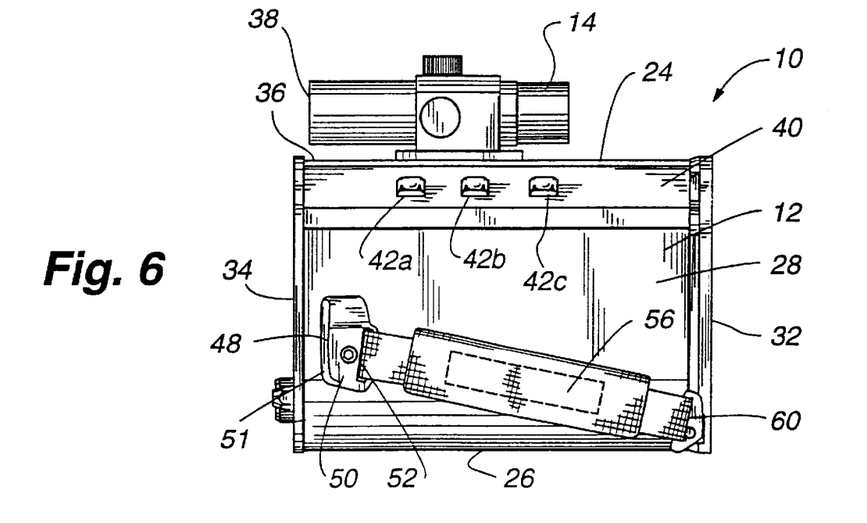
FIG. 6 is a left side elevational view of the range finding apparatus shown in FIGS. 2 and 3.
Figure 7:
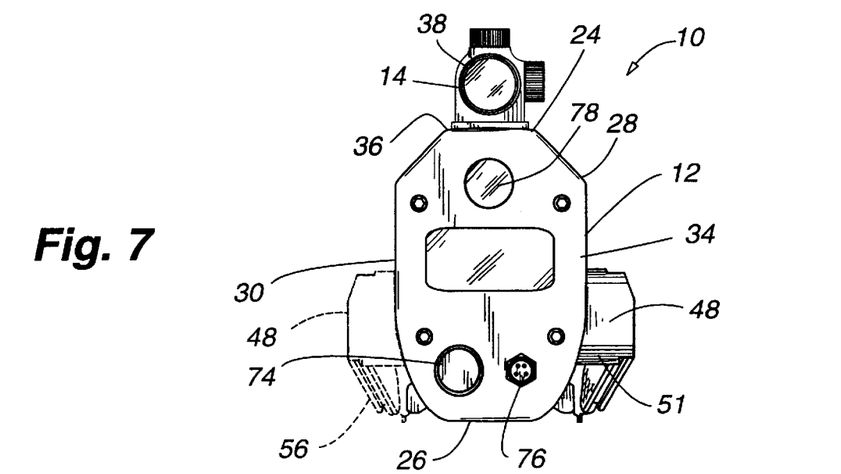
FIG. 7 is a rear elevational view of the range finding apparatus shown in FIGS. 2 and 3.
Figure 8:
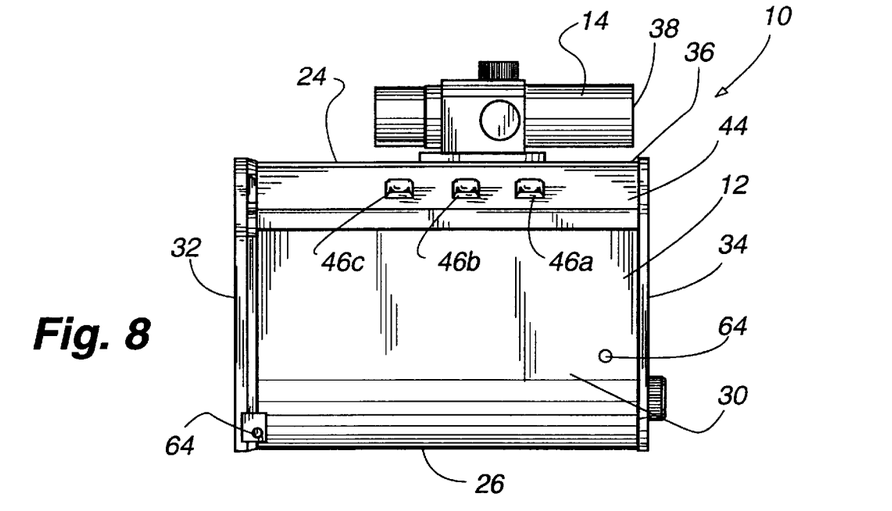
FIG. 8 is a right side elevational view of the range finding apparatus shown in FIGS. 2 and 3.
Figure 9:
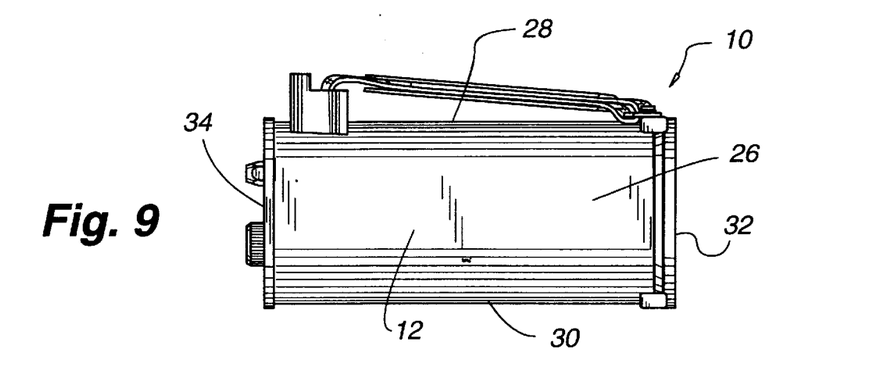
FIG. 9 is a bottom view of the range finding apparatus shown in FIGS. 2 and 3.

The button nearest the rear panel (42a, 46a) is termed the "fire" button. The middle button (42b, 46b) typically scrolls forward through the operating modes or options. The front button (42c, 46c) scrolls the operator backwards through the various available modes and/or options. For example, different measurement modes may include slope distance, height, horizontal distance, inclination, vertical distance, and multiple measurements. Selectable options may include measurement gating, range offsets, pivot offsets, and filtering. The current mode or option is indicated on the display 72 as the buttons are depressed. In addition, the display preferably indicates such conditions as battery, laser firing, and indications for which measurements the instrument is set to take, such as a base measurement when in the height measurement mode or a first measurement during tilt calibration.

Each keypad 44 or 40 may be configured as the primary keypad with the other being configured as a secondary keypad, depending on whether the user is right or left handed. This is done via software in processor 112. The primary keypad is configured by simply toggling one of the system software system settings via the current primary control panel Fire, Back and Forward buttons.

Because the three buttons of the primary control panel 44 or 40 and the three buttons of the secondary control panel select and/or scroll through options and modes, and these modes and options are visually indicated on the display 72, the user need not continually refer to an instruction manual to operate the apparatus 10. The user can simply and conveniently select which mode and option to utilize, take the indicated measurements with one hand, and record or download the measured data.

The present invention may be practiced otherwise than as specifically described above. Many changes, alternatives, variations, and equivalents to the various structures shown and described will be apparent to one skilled in the art. For example, the two apertures 16 and 18 in the front panel may be combined in a single aperture with the transmitted and reflected signals traveling the same path. The control panels or keypads 40 and 44 may be arranged with four buttons rather than three as shown in the figures. The buttons may also be arranged other than in a straight line as shown. For example, they may be arranged along a curve approximating a normal reach of each of three or the four fingers on one's hand. Accordingly, the present invention is not intended to be limited to the particular embodiments illustrated but is intended to cover all such alternatives, modifications, and equivalents as may be included within the spirit and broad scope of the invention as defined by the following claims. All patents and patent applications referred to herein are hereby incorporated by reference in their entirety.

What is claimed is:

1. A distance measuring apparatus having signal emitting circuitry for emitting signals, signal receiving circuitry for receiving reflected signals, and a sighting device, wherein the apparatus comprises:

a housing defining an internal chamber in which the signal emitting and signal receiving circuitry are positioned, said housing further including an upper section to which the sighting device is attached, a front end through which the emitted signals are emitted and the reflected signals are received, a back end, and a display device attached to said housing for displaying operational selections and range findings; and an actuator mounted to said upper section adjacent said sighting device and operably connected to the signal emitting circuitry, for selecting desired operational selections and actuating the signal emitting circuitry wherein said actuator includes a pair of identical push button control panels, one on each side of said sighting device, one of said panels having a button for actuating said signal emitting circuitry.

2. The range finding apparatus of claim 1 further comprising plurality of display modes each of which include at least one of said operational selections, wherein the actuator actuates the one of the operational selections appearing on the display.

3. The range finding apparatus of claim 1 further comprising:

a plurality of hierarchical operational modes for selectively displaying on the display device; and a forward control positioned on the actuator wherein the forward control is adapted to scroll through said hierarchical operational modes on said display in a predetermined sequential order; and a backward control on the actuator adjacent said forward control, wherein said backward control is adapted to scroll through said hierarchical operation modes in a reverse sequential order to the order sequenced by operation of the forward control.

4. The range finding apparatus of claim 3 wherein said actuator comprises a first button positioned adjacent the back end, the forward control comprises a second button and the backward control comprises a third button, wherein one of the second or third buttons is positioned adjacent the front end and the other of the second or third buttons is positioned between the first button and the one of the second or third buttons adjacent the front end.

5. The range finding apparatus of claim 1 wherein the sighting device has a left side and a right side and said actuator positioned on said upper section comprises a first control panel on said right side adjacent the sighting device, and a second control panel positioned on said upper section adjacent the left side of the sighting device.

6. A distance measuring apparatus having signal emitting circuitry for emitting signals, signal receiving circuitry for receiving reflected signals, and a sighting device, wherein the apparatus comprises:

a housing defining an internal chamber in which the signal emitting and signal receiving circuitry are positioned, said housing further including an upper section to which the sighting device is attached, a front end through which the emitted signals are emitted and the reflected signals are received, a back end, and a display device attached to said housing for displaying operational selections and range findings; and an actuator mounted to said upper section adjacent said sighting device and operably connected to the signal emitting circuitry, for selecting desired operational selections and actuating the signal emitting circuitry further comprising:

a plurality of display modes selectively displayable on the display device; and a pair of control panels positioned in the upper section adjacent the sighting device wherein either one of the panels is user selectable as a primary control panel.

7. A method of operating a range finding apparatus having a housing defining an internal chamber, signal emitting circuitry for emitting signals and signal receiving circuitry for receiving reflected signals, a display, a sighting device, and a pair of finger actuated control panels on said housing with one panel on either side of said sighting device, wherein the method comprises the steps of:

holding the range finding apparatus in either one of a user's hands so that the user can see said display;

viewing a plurality of potential targets through the sighting device while holding the range finding apparatus with said one hand;

selecting an operational mode of said display with said one hand;

selecting a target from the plurality of potential targets while continuing to hold the range finding apparatus with said hand;

actuating the signal emitting circuitry with the index finger of said hand, while continuing to hold the range finding apparatus with said hand; and maintaining the position of the range finding apparatus by holding said apparatus with said hand while the signal receiving circuitry receives reflected signals; and reading a range found by the range finding apparatus.

8. The method of claim 7 further comprising the steps of:

actuating a display control on one of said control panels mounted on the range finding apparatus with one or more fingers of said hand while continuing to hold the range finding apparatus with said hand.

9. The method of claim 8 further wherein the display control actuating step is further operative to selectively scroll forwards and backward via one of said control panels through a plurality of operational modes displayed on said display device on the range finding apparatus while continuing to hold the apparatus with said one hand.

10. A laser based distance measuring apparatus comprising:

a hollow tubular housing having an upper section supporting a sighting device and supporting a finger operated actuator, a left side section, a right side section, and a bottom section, said housing adapted to be held and aimed with one hand by a user, said actuator being operated by a finger on said user's one hand;

electronic circuitry carried within said housing, said circuitry including a laser transmit section and a laser receive section, said laser transmit section including a laser diode to emit light pulses through said front panel toward a target upon receipt of a fire command from said finger operated actuator, said laser receive section detecting reflected light signals through said front panel of said housing and producing an electrical output signal in response to said detected reflected light signals;

a processor in said housing coupled to said transmit section and to said receive section for processing said command and processing said output signals from said receive section to compute a range signal; and a display mounted on said rear panel of said housing and connected to said computer for displaying said range signal; and a hand strap fastenable to either one of said left and right side sections for supporting said housing in a user's hand while operating said actuator whereby when said hand strap is fastened to said left side section, a user can hold and operate said actuator on said apparatus with a left hand and when said hand strap is fastened to said right side a user can hold and operate said apparatus with a right hand.

11. The laser range finding apparatus according to claim 10 wherein said actuator comprises a pair of keypads mounted on said housing so that a user may actuate buttons on one keypad of said pair of keypads when holding said housing in a left hand, and may actuate buttons on the other of said keypads when holding said housing with a right hand.

12. The laser range finding apparatus according to claim 11 wherein said keypads are substantially identical.

* * * * *